US011742649B2

(12) United States Patent
Lackinger et al.

(10) Patent No.: US 11,742,649 B2
(45) Date of Patent: Aug. 29, 2023

(54) RESIN POT COMPONENT FOR AN INSPECTABLE BARRIER CABLE GLAND

(71) Applicant: CCG International Holdings Limited, Saint Peter Port (VG)

(72) Inventors: Nicholas Franz Edward Lackinger, Midrand (ZA); Geoffrey Ingles Mood, Whitley Bay (GB)

(73) Assignee: CCG International Holdings Limited, Saint Peter Port (VG)

( * ) Notice: Subject to any disclaimer, the term of this patent is extended or adjusted under 35 U.S.C. 154(b) by 0 days.

(21) Appl. No.: 17/789,642

(22) PCT Filed: Dec. 30, 2020

(86) PCT No.: PCT/IB2020/062538
§ 371 (c)(1),
(2) Date: Jun. 28, 2022

(87) PCT Pub. No.: WO2021/137167
PCT Pub. Date: Jul. 8, 2021

(65) Prior Publication Data

US 2023/0051055 A1 Feb. 16, 2023

(30) Foreign Application Priority Data

Dec. 31, 2019 (GB) ..................................... 1919460

(51) Int. Cl.
*H02G 15/04* (2006.01)
*H02G 15/00* (2006.01)
*F16L 5/10* (2006.01)

(52) U.S. Cl.
CPC ............. *H02G 15/046* (2013.01); *F16L 5/10* (2013.01)

(58) Field of Classification Search
CPC .... H02G 15/046; H02G 15/003; H02G 15/04; H02G 15/00; H02G 15/007;
(Continued)

(56) References Cited

U.S. PATENT DOCUMENTS 4,301,325 A * 11/1981 Hutchison .............. H02G 15/04 174/77 R
5,015,804 A * 5/1991 Nattel .................... H02G 3/088 174/77 R
(Continued)

FOREIGN PATENT DOCUMENTS

AU 2012203154 A1 10/2013
EP 2287084 A1 2/2011
(Continued)

OTHER PUBLICATIONS

International Search Report and Written Opinion for PCT Application No. PCT/IB2020/062538 dated Mar. 12, 2021, 13 pages.
(Continued)

*Primary Examiner* — Angel R Estrada
(74) *Attorney, Agent, or Firm* — Peter W. Schroen; Bret E. Field; Bozicevic, Field & Francis LLP

(57) ABSTRACT

A resin pot assembly for use with a barrier cable gland is provided. The resin pot assembly is shaped and dimensioned to locate within an internal cavity of a cooperating barrier cable gland and has a closable end configured to seal onto a cable sheath of a cable in an installed condition. The resin pot assembly has two, coaxial components configured in the installed condition to surround a plurality of individually electrically insulated conductors extending out of the cable sheath. A first hollow component in the form of a clear cylinder provides the closable end of the resin pot assembly and a second hollow component, which is rigid, provides an pen end of the resin pot assembly and is axially spaced apart
(Continued)

1 14 13 7 6 4 18 5 22 30 from the closable end of the resin pot assembly. The resin pot assembly operatively receives a resin mix therein.

16 Claims, 7 Drawing Sheets

(58) Field of Classification Search
CPC ...... H02G 15/013; H02G 15/103; H02G 3/18; H02G 3/0675; H02G 3/065; F16L 5/10; F16L 5/04; H01R 4/66; H01R 13/59; G02B 6/4471
USPC ....... 174/667, 650, 651, 652, 653, 654, 660, 174/135, 152 G, 153 G, 99 R, 72 A, 68.1, 174/73.1, 74 R, 77 R, 655; 439/587, 589, 439/936, 910; 16/2.1, 2.2; 248/68.1, 49
See application file for complete search history.

(56) References Cited

U.S. PATENT DOCUMENTS 5,310,963 A * 5/1994 Kennelly ............... H02G 3/088 174/650
8,581,120 B2 * 11/2013 Winship ............... H02G 15/013 174/77 R
8,872,027 B2 * 10/2014 Proud .................... H01B 17/30 174/77 R
10,594,127 B2 * 3/2020 Portillo Gallego .. H02G 3/0675
11,451,022 B2 * 9/2022 Hellmann ................ H02G 3/22
11,498,093 B2 * 11/2022 Frizzell .................. H02G 1/145
2013/0112475 A1 5/2013 Magno, Jr. et al.

FOREIGN PATENT DOCUMENTS

GB 2258567 A 2/1993
GB 2501329 B 9/2016
WO WO2019053395 A1 3/2019
WO WO2019220146 A1 11/2019

OTHER PUBLICATIONS

Combined Search and Examination Report for GB Patent Application No. 1919460.4 dated Jun. 17, 2020, 8 pages.
Examination Report for GB Patent Application No. 1919460.4 dated Mar. 15, 2022, 5 pages.
Examination Report for Indian Application No. 202227042845 dated Mar. 3, 2023, 6 pages.

* cited by examiner

RESIN POT COMPONENT FOR AN INSPECTABLE BARRIER CABLE GLAND

CROSS-REFERENCE TO RELATED APPLICATIONS

This application claims priority from United Kingdom patent application number 1919460.4 filed on 31 Dec. 2019, which is incorporated by reference herein.

FIELD OF THE INVENTION

The invention relates to a resin pot component or assembly for a barrier cable gland and in particular for an inspectable barrier cable gland.

BACKGROUND TO THE INVENTION

The applicant is proprietor of GB2501329B which discloses a barrier cable gland having an inner tubular body, which screw-threadedly engages an outer tubular body and/or a union nut. A compression seal engages the cable sheath. The open end of the inner tubular body is turned uppermost and a curable liquid two component resin mix is introduced into a cavity defined by an inwardly directed surface of the inner tubular body and the compression seal at a lower end thereof. A release layer or film is applied to the inwardly directed surface. The resin mix may be introduced by way of a double syringe wherein each of the two liquid components of the resin is separately packaged in a syringe barrel and an elongated mixing nozzle is fitted to the double syringe to effect mixing as resin components are ejected into and through the mixing nozzle. The release layer or film prevents the resin from bonding to the inner tubular body and so allows the gland to be inspected.

There are however disadvantages with the method of inspection described in GB2501329B, including for example having to wait for the resin mix to harden completely before being able to inspect the gland.

The applicant is aware of the ICG/653/Universal, a cable gland assembly manufactured by Hawke International, for an electric cable having a sheath enclosing at least one conductor core. The assembly has a body which may be provided by two connectable parts and a barrier sleeve locatable in the body. In use, the at least one core extends through the body and the sleeve and a hardenable compound is disposed in the sleeve filling the sleeve and surrounding the at least one conductor core. The sleeve, which may also be termed a pot, is made from a clear silicone material, which facilitates inspection.

Use of a clear silicone pot may be advantageous due to lower material and manufacturing costs. This may particularly be the case where a range of sizes of cable gland are required to be available with some (e.g. larger) sizes having very low sales volumes (e.g. in the order of less than ten per year).

However, being flexible, the silicone sleeve or pot can distort while the hardenable compound is disposed in the sleeve. This can lead to a distorted shape which makes it difficult to locate the sleeve in the body. To ameliorate this disadvantage, installation using cable gland assemblies having these clear silicone pots involves having up to two additional steps: one being that the conductor cores (where there are multiple) must be taped together and the other being that the resin must be allowed to gel and then must harden while located within the body to preserve its intended shape. These steps naturally add time and complexity to the installation process.

There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a barrier cable gland having an outer tubular body, an inner tubular body and a resin pot assembly, the tubular bodies being securable to each other to form an internal cavity, the outer tubular body having a free end forming an entry end for a cable, the resin pot assembly being shaped and dimensioned to locate within the internal cavity and having a closable end configured to seal onto a cable sheath of the cable in an installed condition, the resin pot assembly having two, coaxial components configured in the installed condition to surround a plurality of individually electrically insulated conductors extending out of the cable sheath and including a first hollow component in the form of a clear cylinder providing the closable end of the resin pot assembly and a second hollow component providing an open end of the resin pot assembly and being axially spaced apart from the closable end of the resin pot assembly, wherein the resin pot assembly operatively receives a resin mix therein, wherein a side wall provided by the first hollow component is clear and wherein the second hollow component is formed from a rigid material.

Further features may provide for a first end of the clear cylinder to provide the closable end of the resin pot assembly and to be partially closed by way of an integrally formed membrane having a centrally locating aperture defined therein for sealing onto the cable sheath in the installed condition. Further features may provide for the clear cylinder to be formed from a clear silicon rubber material. Further features may provide for the clear cylinder to include a circumferentially extending groove defined in an outer surface of a side wall thereof, for the groove to be located approximately midway between ends of the clear cylinder. Further features may provide for the clear cylinder to provide an inner compression seal.

One embodiment may provide for a second end of the clear cylinder to be open, for the clear cylinder to include a securing formation provided towards the second end thereof for cooperating with a corresponding securing formation of the second hollow component. Further features may provide for the securing formation of the clear cylinder to be provided by a rib extending circumferentially on an interior surface of a side wall of the clear cylinder. Further features may provide for the second hollow component to be in the form of a rigid cylinder including a securing formation provided towards a first end thereof for cooperating with a corresponding securing formation of the first hollow component, for a second end of the rigid cylinder to provide the open end of the resin pot assembly. Further features may provide for the securing formation of the rigid cylinder to be provided by a groove formation defined on an outer surface of a side wall thereof. Further features may provide for the groove to be defined by two spaced apart ribs extending circumferentially on the outer surface of the side wall of the rigid cylinder. Further features may provide for the rigid cylinder to be formed from a metallic material or other rigid material.

Another embodiment provides for a second end of the clear cylinder to be open, for the second hollow component to be in the form of a rigid cylinder having an outer circumference of substantially the same dimension as an inner circumference of the clear cylinder and dimensioned such that a friction or interference fit holds the rigid cylinder within and captive relative to the clear cylinder, for a second end of the rigid cylinder to provide the open end of the resin pot assembly, and for the rigid cylinder to be formed from a clear, rigid material.

Some embodiments may provide for the gland to include an armour clamping cone and for a first end of the clear cylinder to include a coupling formation for coupling the clear cylinder to the armour clamping cone.

In accordance with another aspect of the invention there is provided a kit including the barrier cable gland as described above and a two component resin package including a first cylinder having a first liquid therein and a second cylinder having a second liquid therein, and wherein the first liquid is of a bright or light colour and the second liquid is of a colour selected such that the two liquids mix to form a two component resin mix having a bright or light colour.

A further aspect may provide for the first liquid to be yellow in colour and the second liquid to be of a colour selected such that the two liquids mix to form a two component resin mix having a bright yellow colour.

In accordance with another aspect of the invention there is provided a two component resin package including a first cylinder having a first liquid therein and a second cylinder having a second liquid therein, and wherein the first liquid is of a bright or light colour and the second liquid is of a colour selected such that the first liquid and the second liquid mix to form a two component resin mix having a bright or light colour.

A further feature may provide for the first liquid to be yellow in colour and the second liquid to be of a colour selected such that the first liquid and the second liquid mix to form a two component resin mix having a bright yellow colour.

In accordance with another aspect of the invention there is provided a resin pot assembly for use with a barrier cable gland having an outer tubular body and an inner tubular body being securable to the outer tubular body to form an internal cavity, the resin pot assembly having two, coaxial components being shaped and dimensioned to locate within the internal cavity and having a closable end configured to seal onto a cable sheath of a cable in an installed condition and to surround a plurality of individually electrically insulated conductors extending out of the cable sheath, the resin pot assembly including a first hollow component in the form of a clear cylinder providing the closable end of the resin pot assembly and a second hollow component providing an open end of the resin pot assembly and being axially spaced apart from the closable end of the resin pot assembly, wherein the resin pot assembly operatively receives a resin mix therein, wherein a side wall provided by the first hollow component is clear and wherein the second hollow component is formed from a rigid material.

Embodiments of the invention will now be described, by way of example only, with reference to the accompanying drawings.

DETAILED DESCRIPTION WITH REFERENCE TO THE DRAWINGS

Figure 1:
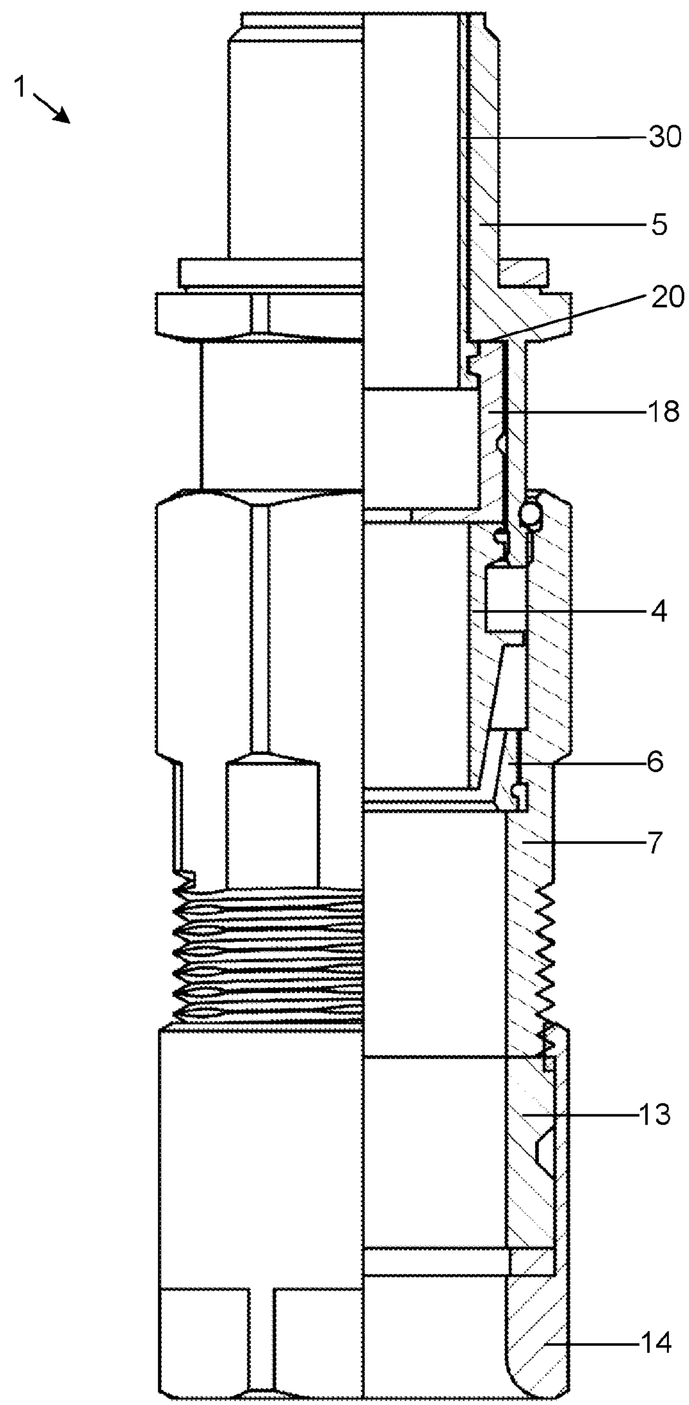
FIG. 1 is a half section view from the front of a barrier cable gland according to a first embodiment.

Aspects of the present disclosure provide a barrier cable gland which facilitates inspection of an installation of the barrier cable gland with less effort and without adding to the time or complexity of the installation process. Aspects of the present disclosure provide for such a barrier cable gland to include a resin pot component shaped and dimensioned to locate within an internal cavity of the barrier cable gland. The resin pot component operatively receives a resin mix (such as a curable liquid two component resin mix) therein. The resin pot component may have a closable end configured to seal onto a cable sheath of a cable in an installed condition. The resin pot component may have two portions (which may be coaxial) which are configured in the installed condition to surround a plurality of individually electrically insulated conductors extending out of a cable sheath of the cable. The two portions may include a first portion providing the closable end of the resin pot component and a second portion providing an open end of the resin pot component. The second portion may be axially spaced apart or away from the closable end of the resin pot component. A side wall provided by the first portion of the resin pot component may be clear (such as transparent or translucent or at least partially see-through) while the second portion of the resin pot component is formed from a rigid material (such as a hard plastic or metal).

In one example embodiment described herein, the resin pot component is in the form of an assembly including a first hollow component in the form of a clear cylinder providing the closable end of the assembly and a second hollow component providing an open end of the assembly. The clear cylinder is made from a clear silicone rubber material which is sufficiently deformable in order to be able to inspect the resin and seal in the gland body. The second hollow component is formed from a rigid material that is substantially rigid so as not to deform during the installation process (e.g., by the cable conductors when they are splayed open in order to inject the resin between the cores and into the resin pot assembly). The second hollow component may, but does not have to, be formed from a clear, rigid material. Such an arrangement thus includes a clear portion and a rigid portion to provide an inspectable barrier cable gland that can be manufactured in a range of sizes.

The resin pot component according to aspects of the present disclosure may therefore have a clear portion and a rigid portion, with the clear portion forming one end of the resin pot component and the rigid portion forming the other end of the resin pot component.

The term "clear" as used herein should be broadly construed so as to mean easily seen through for the purpose of inspection of a resin mix and may encompass translucent through to transparent materials. In other words, a clear portion of a resin pot component may range from being capable of transmitting light but causing some degree of diffusion to prevent clear perception of distinct images through to being capable of transmitting light so that objects or images can be seen as if there were no intervening material.

The term "rigid" as used herein should be broadly construed so as to mean not flexible or pliant. In other words, a rigid portion of a resin pot component as described herein may be stiff or not flexible such that a shape thereof is not capable of being deformed or changed during introduction or curing of resin mix.

The two portions of the resin pot component may be integrally formed in some embodiments or may be an assembly of discrete or separate parts connectable to each other to provide the resin pot component in other embodiments.

The resin pot component may take on various forms. In some embodiments, the resin pot component may be in the form of a sleeve which cooperates with a portion or part of the barrier cable gland in order to seal onto the cable sheath. In other words, the resin pot component may seal onto the cable sheath by sealing onto a part or portion of the barrier cable gland which itself seals onto the cable sheath. In any event, the resin pot component as described herein may be arranged to cooperate with the cable sheath and/or barrier cable gland to define a pot or barrel which has an open end and an operatively closed end into which a resin mix may be introduced and held (at least for as long as it takes for the resin mix to gel). In some embodiments, the resin pot component may be made up of a clear, inner compression seal (providing the clear portion) connectable to a metallic or otherwise hardened tubular portion (providing the rigid portion). Other configurations of a resin pot having a clear portion and a rigid portion are anticipated. It may for example be that the rigid portion is provided by a ring or rigid lip that is fixed or secured to the clear portion, which may be flexible.

The rigid portion is provided to permit gelling of the resin mix while preventing the shape of the resin pot component from distorting. This allows for the resin pot component to be filled with resin mix and permitted to gel without adding additional installation steps of, for example, having to fit the resin pot component in the internal cavity of the gland and holding the gland upright while waiting for the resin mix to gel. The resin pot component then has to be removed from the gland to inspect the resin mix only to be reinserted into the gland so as to complete the installation process.

The clear portion may be made from a flexible material, such as a clear silicone rubber. A clear silicone rubber may be selected so as to be able to withstand the wide temperature ranges expected of the resin pot component.

Further to facilitate inspection of the installation of the barrier cable gland, aspects of the present disclosure further provide a resin mix (such as a curable liquid two component resin mix) having a bright and/or light colour (such as yellow, white, orange, pink, light blue, light green, light red and the like). Such colours may facilitate inspection of the resin mix through the clear portion of the resin pot component. The resin mix may be distributed in a two component resin package (or a double-barrelled syringe) including a first cylinder having a first liquid therein and a second cylinder having a second liquid therein. The first liquid may be of a bright or light colour and the second liquid may be of a colour selected such that the two liquids mix to form a two component resin mix having a bright or light colour. The second liquid may have the same colour as the first liquid, or it may have a light colour (such as white) or it may be clear.

Figure 2:
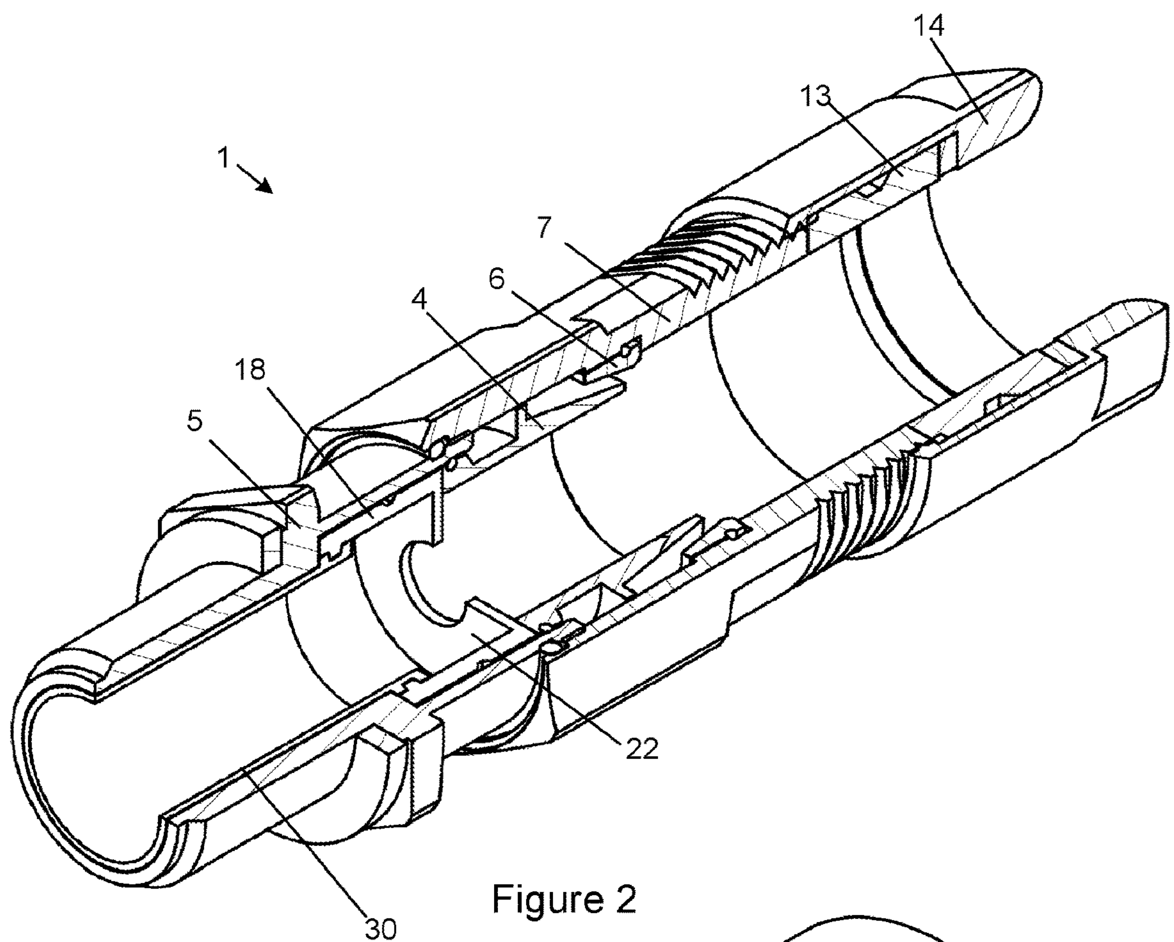
FIG. 2 is a three-dimensional view of the barrier cable gland of FIG. 1 with a cutting plane providing the half section view of FIG. 1 removing a portion of the gland.
Figure 3:
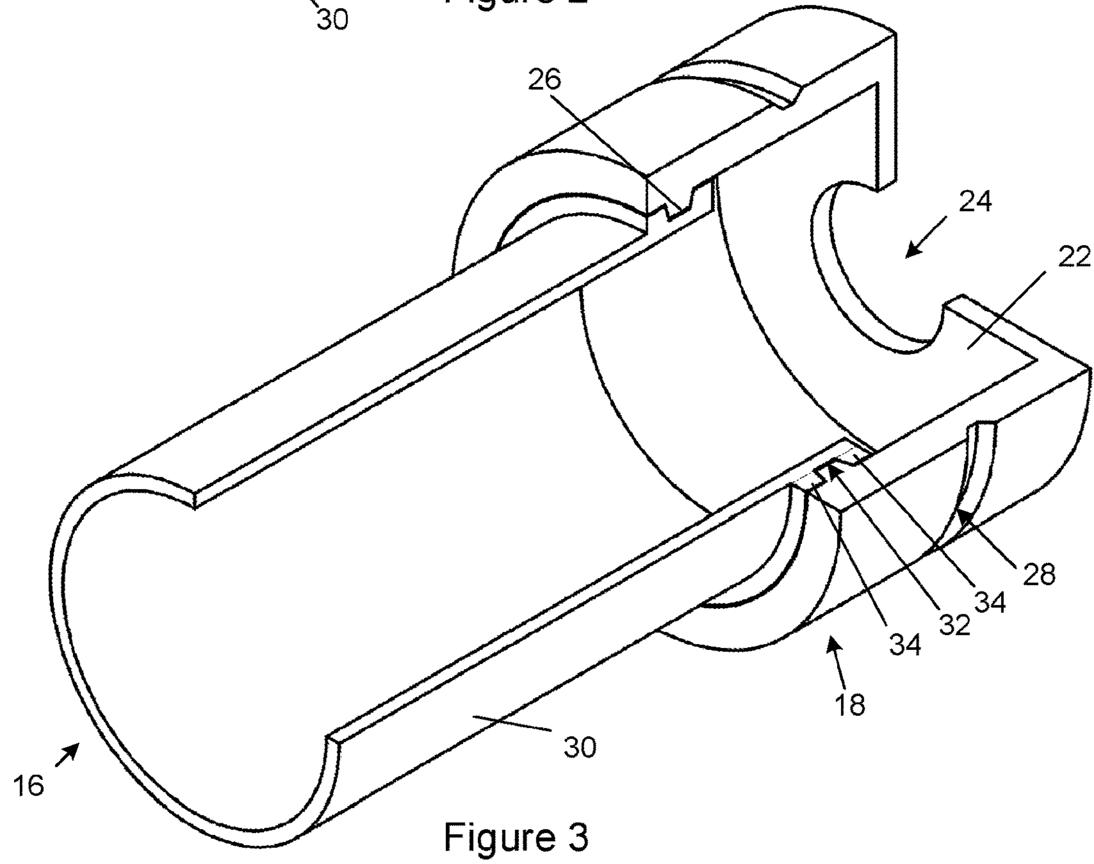
FIG. 3 is a three-dimensional view of a resin pot component of the barrier cable gland of FIG. 1 with a cutting plane providing the half section view of FIG. 1 removing a portion of the resin pot component.
Figure 10:
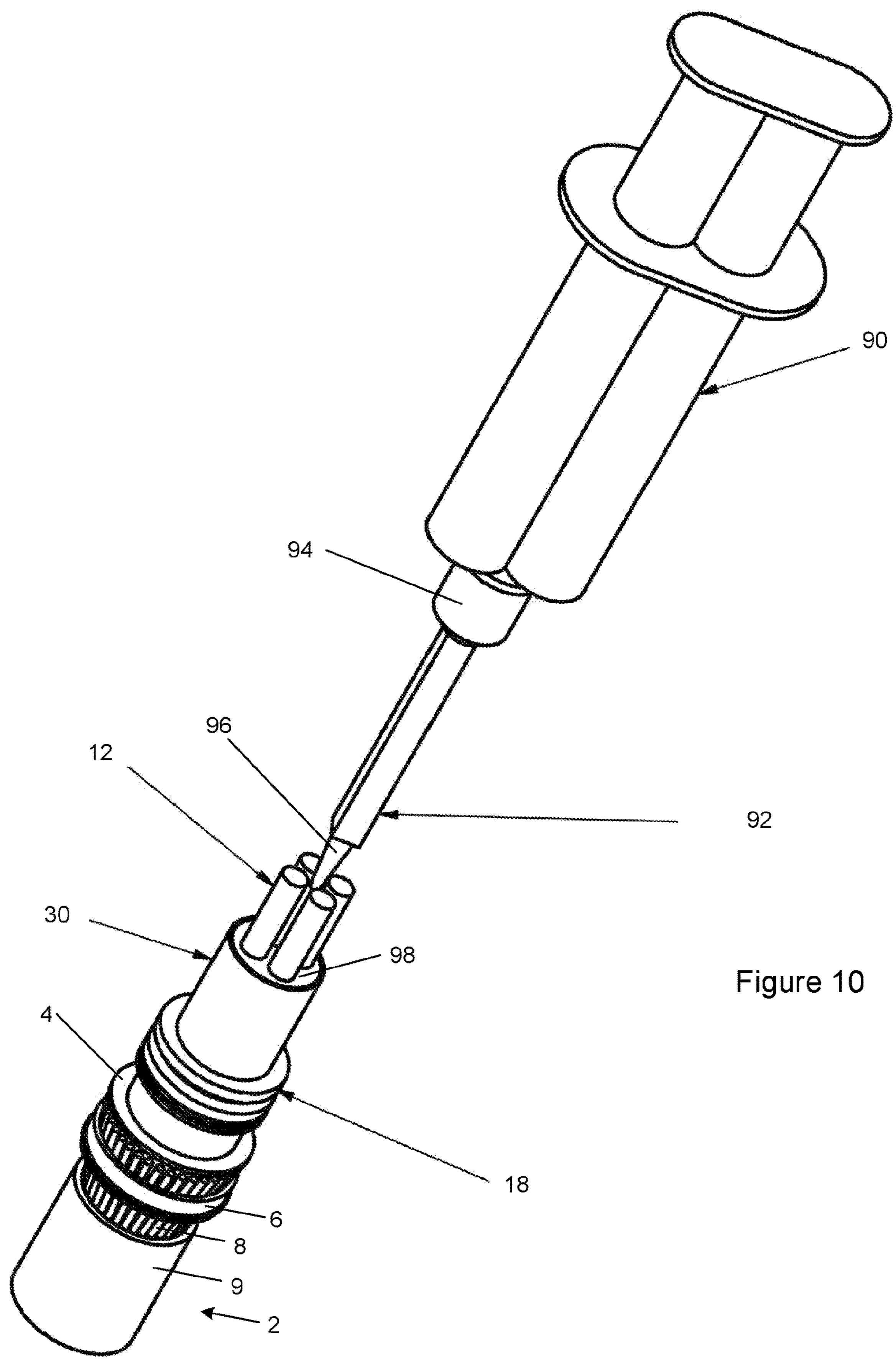
FIG. 10 is a schematic diagram which illustrates a barrier cable gland and a two component resin package in use according to embodiments of the present disclosure.

FIGS. 1 to 3 illustrate one embodiment of a barrier cable gland (1) according to aspects of the present disclosure. FIG. 10 illustrates an example installation of such a barrier cable gland.

The gland (1) may be made for use on an armoured or screened (herein referred to as "armour" irrespective of its exact nature) electrical cable (2) and may include an armour clamp assembly that typically includes an armour clamping cone (4) preferably held captive relative to an inner tubular body (5) and a cooperating clamping ring (6) that is preferably held captive relative to an outer tubular body (7). The armour clamp assembly operatively urges the armour clamping cone (4) into the cooperating clamping ring to firmly clamp armour wires (8) of the cable that pass between an outer electrically insulating sheath (9) and an inner electrically insulating sheath (not shown). This is achieved by screwing the inner tubular body that has an external screw-thread on its outer surface into the outer tubular body that has an internal cooperating screw-thread on an inner surface thereof. A series of individually insulated conductors (12) extend along the length of the cable within the inner electrically insulating sheath.

The inner tubular body (5) and outer tubular body (7) are securable to each other by way of the cooperating screw threaded portions to form an internal cavity. In the illustrated embodiment, the inner tubular body has an externally screw threaded portion in cooperating engagement with an internally screw threaded portion of the outer tubular body. The outer tubular body (7) has a free end which forms an entry end for a cable. The entry end of the cable gland has an outer compression seal (13) that is brought into operation by its own union style nut (14).

Within the cable gland (1) is a resin pot component (16) which is shaped and dimensioned to locate within the internal cavity. The resin pot component (16) includes two portions, which are coaxial in the illustrated embodiment and are provided by two discrete, hollow components. In the illustrated embodiment, the resin pot component is an assembly including a first hollow component providing the clear portion of the resin pot component and a second hollow component providing the rigid portion of the resin pot component.

In the illustrated embodiment, the first hollow component is in the form of a clear cylinder (18), which may be termed a clear cylinder inspection pot seal, and which provides an inner compression seal that is operatively positioned between an end of the armour clamping cone (4) remote from the armour clamp assembly and a shoulder (20) within the inner tubular body.

A first end of the clear cylinder (18) provides the closable end of the resin pot component and is partially closed by way of an integrally formed membrane (22) having a centrally locating aperture (24) defined therein for sealing onto the (inner) cable sheath in the installed condition. The clear cylinder includes a securing formation provided towards an opposite and open end thereof for cooperating with a corresponding securing formation of the second hollow component. In the illustrated embodiment, the securing formation of the clear cylinder is provided by a rib (26) extending circumferentially on an interior surface of a side wall of the clear cylinder. In other embodiments the securing formation may be provided by other formations or features. In the illustrated embodiment, the clear cylinder includes a circumferentially extending groove (28) defined in an outer surface of a side wall thereof and located approximately midway between ends of the clear cylinder. The clear cylinder (18) may be formed from any suitable clear, transparent or translucent material which can preferably withstand a temperature range from −60 degrees centigrade up to 160 degrees centigrade. In some embodiments, the clear cylinder may be formed from a clear, transparent or translucent and flexible or resiliently deformable material. In some embodiments, the clear cylinder is formed from a clear silicone rubber material.

In the illustrated embodiment, the second hollow component is in the form of a rigid cylinder (30) including a securing formation provided towards a first end thereof for cooperating with a corresponding securing formation of the first hollow component. A second end of the rigid cylinder (30) provides the open end of the resin pot component.

In the illustrated embodiment, the securing formation of the rigid cylinder is provided by a groove formation (32) defined on an outer surface of a side wall thereof. The groove is defined by two spaced apart ribs (34) extending circumferentially on the outer surface of the side wall of the rigid cylinder. The rigid cylinder may be made or formed from any suitably rigid material, such as a metallic material, a high-quality rigid composite or plastic material or the like.

With the rigid cylinder secured to the clear cylinder a generally cylindrical cavity is defined through which the individually electrically insulated conductors pass in use.

The resin pot component (16) is configured to seal onto the cable sheath in the installed condition to define a closed or blind end which is proximate the armour clamping cone (4) and an open end, which is opposite the closed end, by way of which resin mix can be introduced while the inner tubular body (5) is separated and spaced apart from the outer tubular body (7). The resin pot component operatively provides a bot or barrel or container for holding resin mix while it sets or gels. The clear portion provided by the clear cylinder facilitates inspection of the resin mix while the rigid portion provided by the rigid cylinder ensures that the resin pot component maintains its shape and is easily locatable within the internal cavity once the resin mix has gelled or set.

Figure 4:
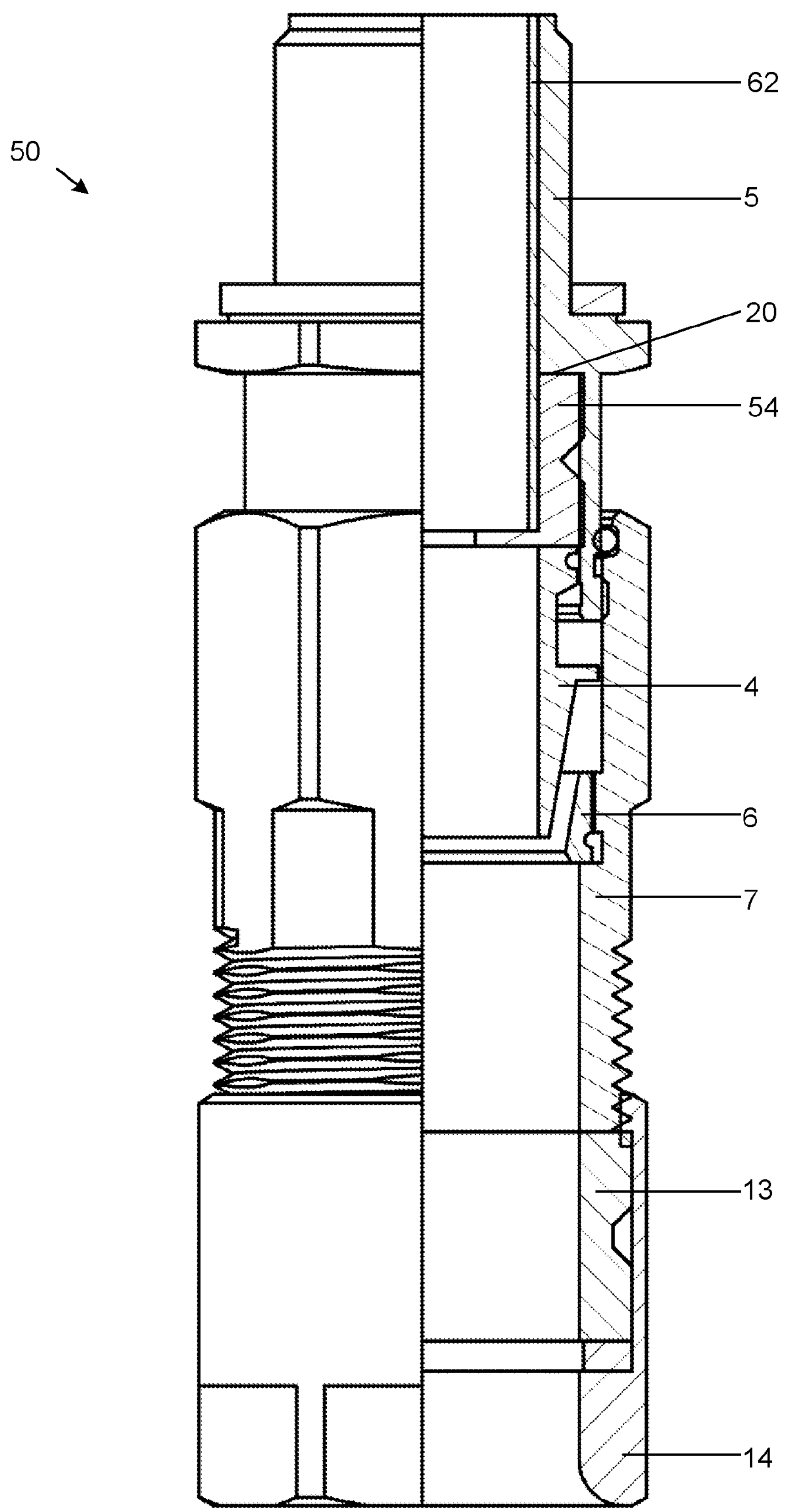
FIG. 4 is a half section view from the front of a barrier cable gland according to another embodiment.
Figure 5:
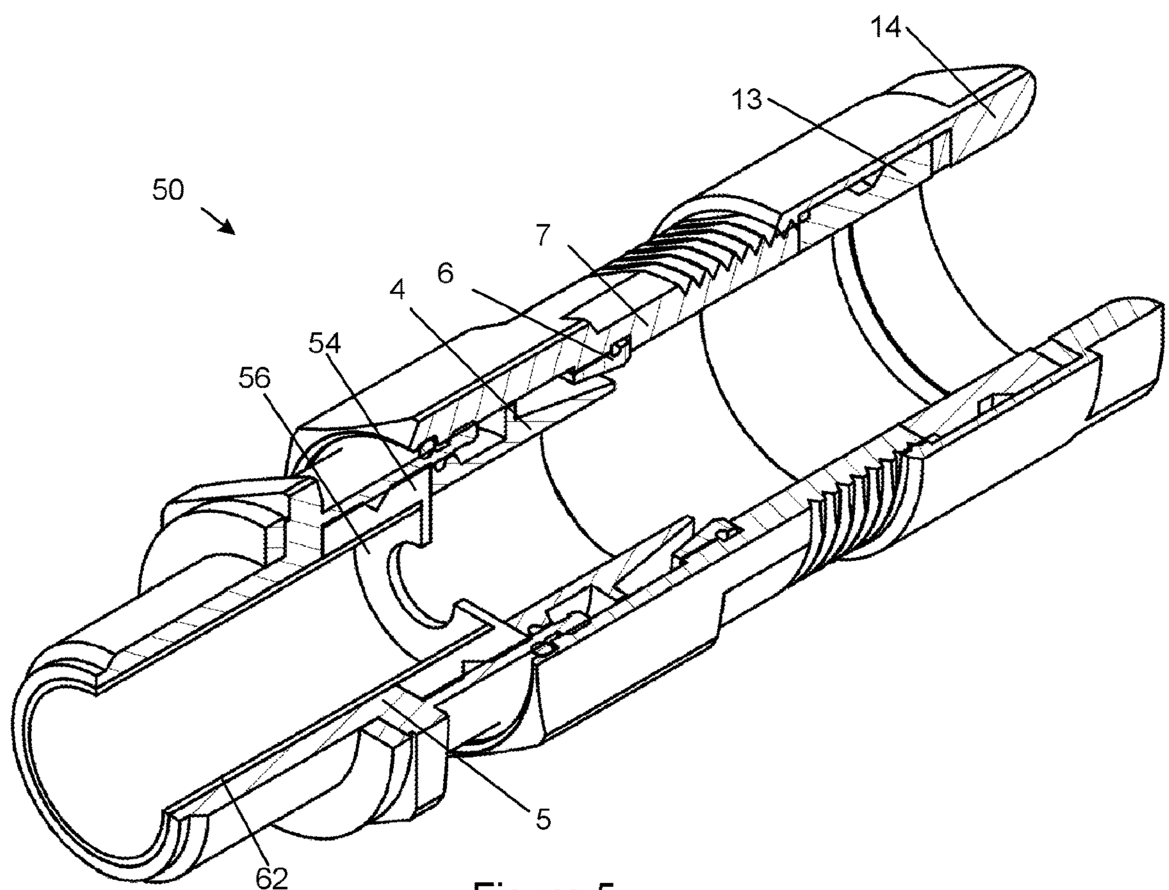
FIG. 5 is a three-dimensional view of the barrier cable gland of FIG. 4 with a cutting plane providing the half section view of FIG. 4 removing a portion of the gland.
Figure 6:
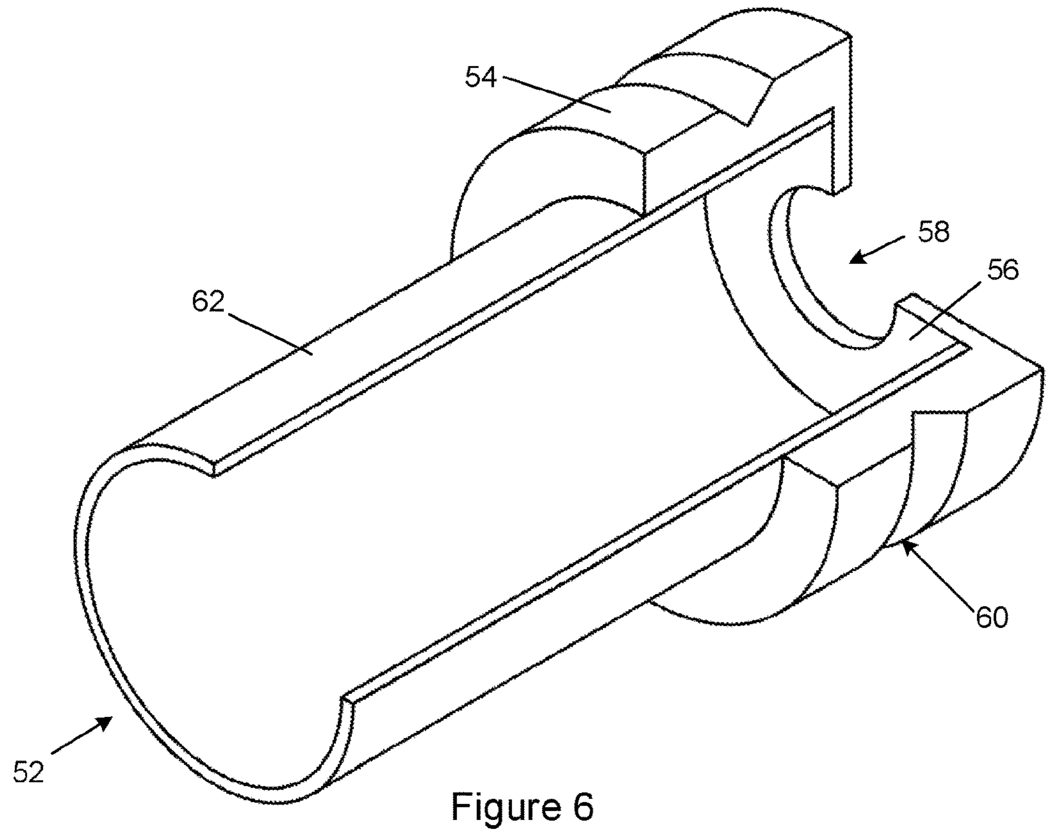
FIG. 6 is a three-dimensional view of a resin pot component of the barrier cable gland of FIG. 4 with a cutting plane providing the half section view of FIG. 4 removing a portion of the resin pot component.

FIGS. 4 to 6 illustrate another embodiment of a barrier cable gland (50) according to aspects of the present disclosure. The gland of this embodiment is substantially the same as the gland described above with reference to FIGS. 1 to 3 and differs primarily in so far as the resin pot component is concerned (52). The example installation illustrated in FIG. 10 is mutatis mutandis applicable to this embodiment of the barrier cable gland.

In the embodiment described with reference to FIGS. 4 to 6, the resin pot component (52) is shaped and dimensioned to locate within the internal cavity of the barrier cable gland (50) and is in the form of an assembly including two portions. The two portions are coaxial in the illustrated embodiment and are provided by two discrete, hollow components which respectively provide clear and rigid portions of the resin pot component.

A first of the two hollow components is in the form of a clear cylinder (54) which provides an inner compression seal that is operatively positioned between an end of the armour clamping cone (4) remote from the armour clamp assembly and a shoulder (20) within the inner tubular body.

A first end of the clear cylinder (54) provides the closable end of the resin pot component and may be partially closed by way of an integrally formed membrane (56) having a centrally locating aperture (58) defined therein for sealing onto the cable sheath in the installed condition.

In the illustrated embodiment, the clear cylinder includes a circumferentially extending groove (60) defined in an outer surface of a side wall thereof and located approximately midway between ends of the clear cylinder. The groove is V-shaped in cross-section in the illustrated embodiment, although grooves with other shaped cross-sections may be used. The clear cylinder (54) may be formed from any suitable clear, transparent or translucent material which can preferably withstand a temperature range from −60 degrees centigrade up to 160 degrees centigrade. In some embodiments, the clear cylinder may be formed from a clear, transparent or translucent and flexible or resiliently deformable material. In some embodiments, the clear cylinder is formed from a clear silicone rubber material.

A second of the two hollow components is in the form of a rigid cylinder (62). An outer circumference of the rigid cylinder is of substantially the same dimension as an inner circumference of the clear cylinder such that the rigid cylinder can fit within the clear cylinder. The two cylinders may be dimensioned such that a friction or interference fit holds the rigid cylinder within and captive relative to the clear cylinder with a first end of the rigid cylinder urged against the friction or interference fit into the clear cylinder until it abuts the membrane (56). In other embodiments, cooperating securing formations may be provided on one or both of the cylinders to hold them captive relative to each other. A second end of the rigid cylinder (62) provides the open end of the resin pot component.

In the embodiment illustrated with reference to FIGS. 4 to 6, the rigid cylinder may be made or formed from any suitably clear, rigid material, such as a high-quality rigid composite or plastic material or the like. The rigid cylinder locating coaxially within the clear cylinder together define a generally cylindrical cavity through which the individually electrically insulated conductors pass in use. The clear nature of both the clear and rigid cylinders allows for visual inspection of the resin mix injected into the cylindrical cavity. The rigid nature of the rigid cylinder prevents deformation of the shape of the resin pot component during the gelling or setting of the resin mix injected therein.

Figure 7:
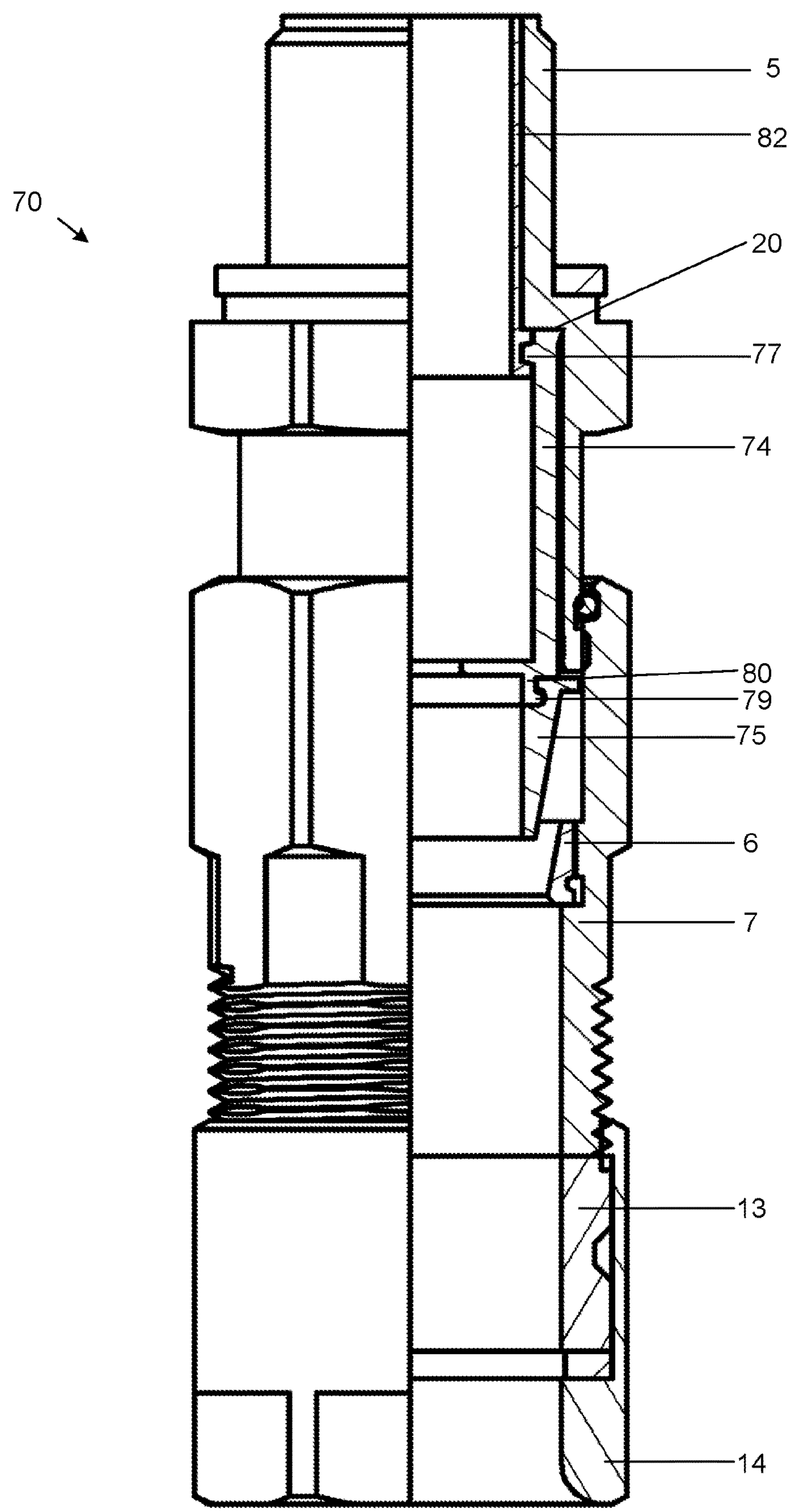
FIG. 7 is a half section view from the front of a barrier cable gland according to yet another embodiment.
Figure 8:
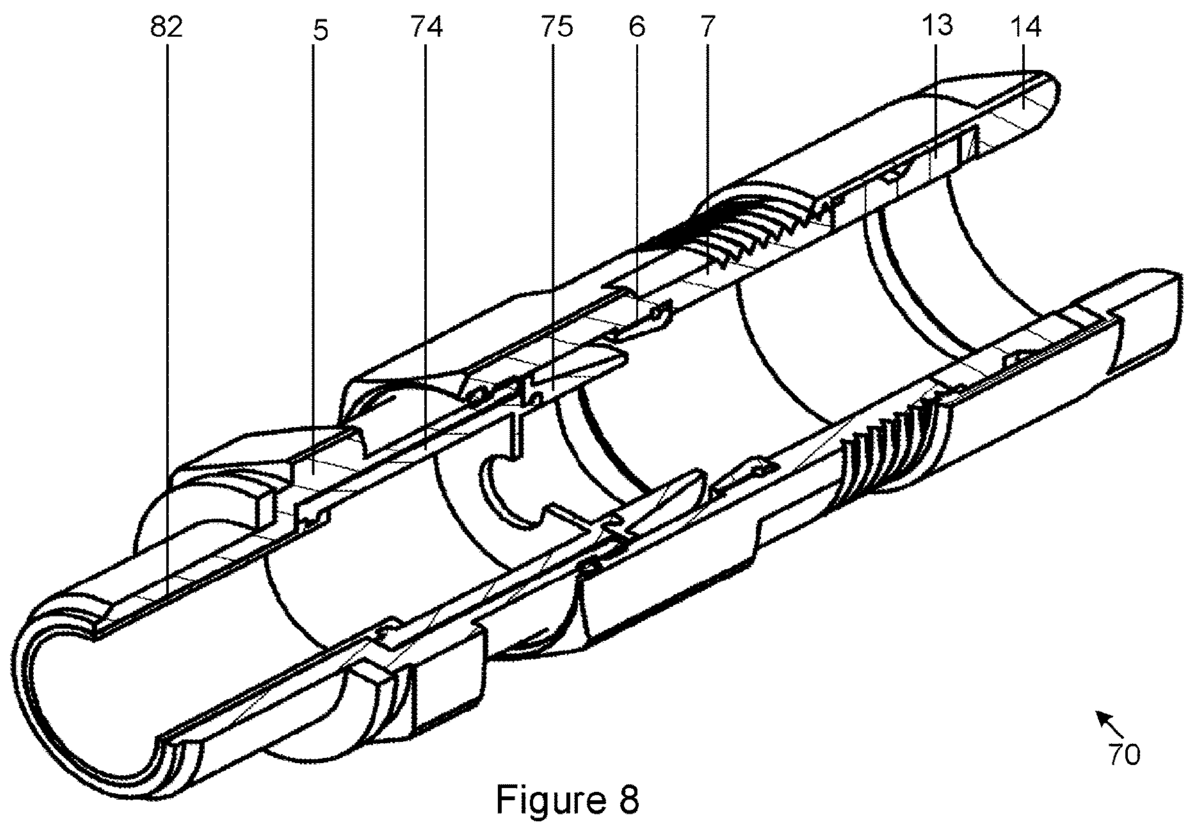
FIG. 8 is a three-dimensional view of the barrier cable gland of FIG. 7 with a cutting plane providing the half section view of FIG. 7 removing a portion of the gland.
Figure 9:
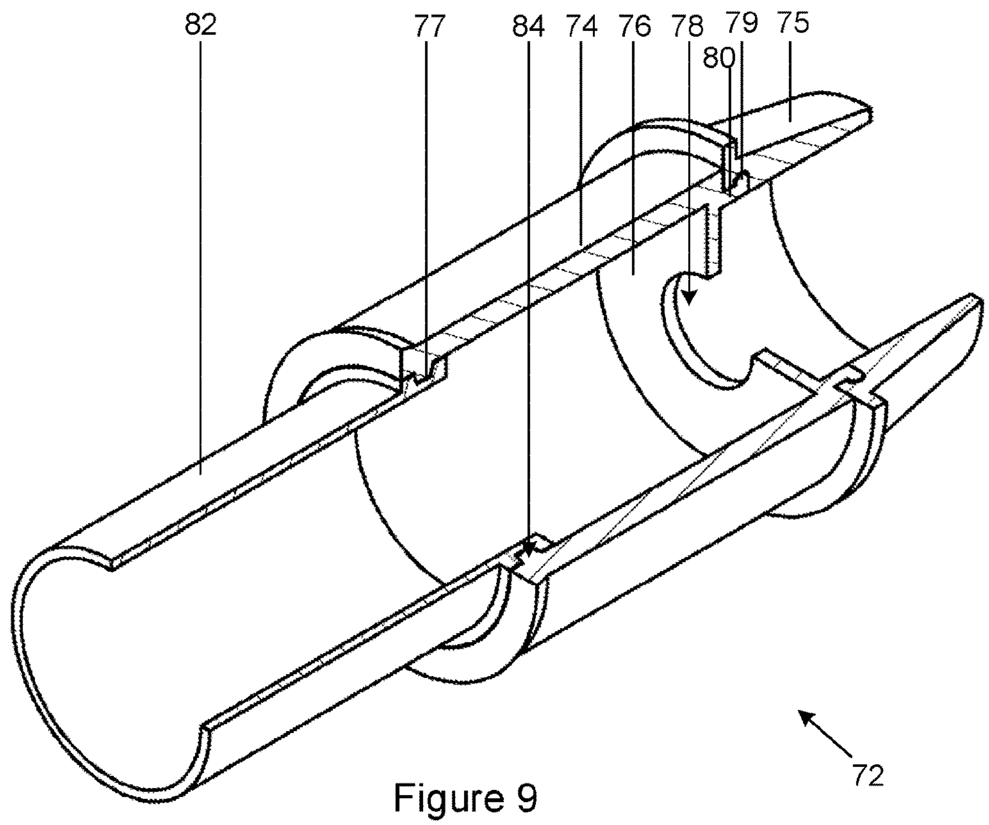
FIG. 9 is a three-dimensional view of a resin pot component coupled to a armour clamping cone of the barrier cable gland of FIG. 7 with a cutting plane providing the half section view of FIG. 7 removing a portion of the resin pot component and armour clamping cone.

FIGS. 7 to 9 illustrate another embodiment of a barrier cable gland (70) according to aspects of the present disclosure. The gland of this embodiment is substantially the same as the glands described above and differs primarily in so far as the resin pot component (72) and armour clamping cone are concerned. The example installation illustrated in FIG. 10 is mutatis mutandis applicable to this embodiment of the barrier cable gland.

In the embodiment described with reference to FIGS. 7 to 9, the resin pot component (72) is shaped and dimensioned to locate within the internal cavity of the barrier cable gland (70) and is in the form of an assembly including two portions. The two portions are coaxial in the illustrated embodiment and are provided by two discrete, hollow components which respectively provide clear and rigid portions of the resin pot component.

A first of the two hollow components is in the form of a clear cylinder (74) which provides an inner compression seal that is operatively positioned between an end of an armour clamping cone (75) remote from the armour clamp assembly and a shoulder (20) within the inner tubular body.

A first end of the clear cylinder (74) provides the closable end of the resin pot component and may be partially closed by way of an integrally formed membrane (76) having a centrally locating aperture (78) defined therein for sealing onto the cable sheath in the installed condition.

In the illustrated embodiment, the clear cylinder includes a securing formation provided towards an opposite and open end thereof for cooperating with a corresponding securing formation of the second hollow component. The securing formation of the clear cylinder may be provided by a rib (77) extending circumferentially on an interior surface of a side wall of the clear cylinder. In other embodiments the securing formation may be provided by other formations or features or may be omitted in favour of an interference or friction fit (e.g. as in the embodiment described with reference to FIGS. 4 to 6).

In the illustrated embodiment, the first end of the clear cylinder includes a coupling formation for coupling the clear cylinder (74) to the armour clamping cone (75). In the illustrated embodiment, the coupling formation includes a lip (79) supported on and extending radially from a supporting ring (80) which extends coaxially from the first end of the clear cylinder.

The armour clamping cone (75) has a cooperating coupling formation which in the illustrated embodiment includes a channel which is recessed into an interior surface of a wall providing the armour clamping cone. The armour clamping cone is radially stepped at the end providing the coupling formation to accommodate the supporting ring such that the clear cylinder and the armour clamping cone cooperate to define a generally cylindrically shaped void accessible via the centrally locating aperture (78) defined in the integrally formed membrane (76) of the clear cylinder.

In some embodiments, the clear cylinder may include a circumferentially extending groove defined in an outer surface of a side wall thereof and located approximately midway between ends of the clear cylinder.

The clear cylinder (74) may be formed from any suitable clear, transparent or translucent material which can preferably withstand a temperature range from −60 degrees centigrade up to 160 degrees centigrade. In some embodiments, the clear cylinder may be formed from a clear, transparent or translucent and flexible or resiliently deformable material. In some embodiments, the clear cylinder is formed from a clear silicone rubber material.

In the illustrated embodiment, the second hollow component is in the form of a rigid cylinder (82) including a securing formation provided towards a first end thereof for cooperating with a corresponding securing formation of the first hollow component. A second end of the rigid cylinder (82) provides the open end of the resin pot component. In the illustrated embodiment, the securing formation of the rigid cylinder is provided by a groove formation (84) defined on an outer surface of a side wall thereof. The groove may be defined by two spaced apart ribs extending circumferentially on the outer surface of the side wall of the rigid cylinder. In other embodiments, the rigid cylinder may be dimensioned such that a friction or interference fit holds the rigid cylinder within and captive relative to the clear cylinder as described above with reference to FIGS. 4 to 6. The rigid cylinder (82) may be made or formed from any suitably rigid material, such as a metallic material, a high-quality rigid composite or plastic material or the like. In some embodiments, the rigid cylinder may be made or formed from a clear, rigid material.

The rigid cylinder locating coaxially within the clear cylinder together define a generally cylindrical cavity through which the individually electrically insulated conductors pass in use. The clear nature of the clear cylinder allows for visual inspection of the resin mix injected into the cylindrical cavity. The rigid nature of the rigid cylinder prevents deformation of the shape of the resin pot component during the gelling or setting of the resin mix injected therein.

As shown most clearly in FIG. 10, a gland such as those described in the foregoing is installed by removing the outer insulating sheath (9) for a distance from a free end of the cable so that the outer sheath is engaged by the outer compression seal in the installed condition. Similarly, the inner electrically insulating sheath is removed from a position that is approximately in line with the inner compression seal in the installed condition so that the plurality of individual conductors (12) of the cable project out of the open end of the inner tubular body (5) part of the cable gland.

The outer tubular body and union nut and outer compression seal may be fitted around the cable (2) ready to be secured to the inner tubular body. The armour clamp assembly is then fitted to clamp the wires (8) of the armour between the armour clamping cone (4) and the armour clamping ring (6) with the terminus of the inner insulating sheath extending just beyond the armour clamp assembly.

The resin pot component (16, 52, 72) can then be sealed onto the inner electrically insulating sheath proximate its terminus. The resin pot component is sealed onto the inner cable sheath by urging the centrally locating aperture (24, 58, 78) over the sheath. The resin pot component may be sealed onto the inner electrically insulating sheath with the rigid portion thereof attached thereto, or this may be done afterwards. In any event, the resin pot component is installed onto the inner electrically insulating cable sheath for receiving resin mix therein.

The resin pot component (16, 52, 72) seals around and surrounds the plurality of individually electrically insulated conductors (12) that extend out of the inner cable sheath. In the embodiments described in the foregoing, the resin pot component includes a flexible membrane with a centrally locating aperture that seals onto the inner cable sheath proximate the position from which the inner cable sheath is removed.

Preparatory to carrying introducing the resin mix, the armour clamp assembly with resin pot component fitted thereto is orientated so that an open end of the resin pot component is uppermost.

Curable liquid two component resin mix is then introduced into the cylindrical cavity defined by the resin pot component by way of a two component resin package (90). The two component resin package may include a first cylinder having a first liquid therein and a second cylinder having a second liquid therein. The first liquid may be a resin (e.g. of the epoxy variety of resin), and the second liquid may be a hardener, or vice versa. The two component resin package (90) may be provided by a double syringe wherein each of the two liquid components, namely the resin and the hardener, is separately packaged in a syringe barrel. In some embodiments, one or both of the first liquid or the second liquid has a bright and/or light colour and the other of the second liquid or the first liquid has a colour selected such that the resultant resin mix has a bright and/or light colour.

In some embodiments, one of the first liquid or the second liquid is yellow in colour and the other of the second liquid or the first liquid is of a colour selected such that the first liquid and the second liquid mix to form a two component resin mix having a bright yellow colour. A bright yellow colour may be a colour that substantially matches one or more of Yellow C; Yellow 012 C; Medium Yellow C of the Pantone Colour Matching System and the like. Other embodiments may make use of other bright colours, such as orange, pink, lime green and the like.

The outlets from the syringe barrels are fitted with an elongated mixing nozzle (92) extending from a manifold (94) connecting the two outlets. The mixing nozzle serves the purpose of effecting intimate mixing of the two components as they pass tortuously through a series of spaced baffles projecting alternately into a restricted flow path from opposite sides of the flow path. It will be understood that operation of one of these double syringes can be carried out using one hand whilst the other hand can be used to support the armour clamp assembly and its associated cable.

The double syringe dispenser is conveniently a commercially available package of epoxy resin components although it is envisaged that it may be advantageous to produce custom double syringe dispensers that would have a more appropriate total volume of resin for a particular size of cable gland. In order to facilitate the introduction of the resin mix into rather small spaces and voids between the individually insulated electrical conductors, a smaller cross-sectioned tubular extension (96) may be attached to the discharge end of the mixing nozzle. Such a smaller cross-sectioned tubular extension may thus be used to facilitate introducing the liquid resin mix in between the individual conductors by manipulating the double syringe dispenser appropriately.

The resin mix is introduced into the cavity to substantially fill the generally cylindrical cavity (e.g. from the closable end up to an open end of the resin pot component) so as to substantially fill voids between individual conductors of the cable and the immediately surrounding cable sheath in the first place, and between the individual electrically insulated conductors and the inwardly directed cylindrical surface of the second hollow component of the resin pot component. The seal provided by the flexible membrane of the clear cylinder onto the cable sheath prevents the liquid resin from further flowing past the cable end and into the gland body.

This cavity is preferably filled with resin mix substantially to the open end of the resin pot component so as to form a solid plug (98) of set resin extending from the closable end of the resin pot component (e.g. from the flexible membrane of the clear cylinder) to the formerly open end of the resin pot component (and hence the open end of the cable gland, once installed). The resin mix will also abut the cut off end of the inner cable sheath thereby, in effect, forming an extension to the inner cable sheath.

The clear portion of the resin pot component facilitates visual inspection of the installation, for example to ensure that no voids are present. Inspection may be further facilitated by virtue of the resin mix having a bright and/or light colour which may make the resin mix easier to inspect through the clear portion of the resin pot component and through the open end of the resin pot component.

The rigid portion of the resin pot component resists deformation of the resin pot component during introduction and gelling and/or setting of the resin mix and means that the resin mix can be allowed to gel without needing to seat the resin pot component in the internal cavity of the barrier cable gland. The installation process is thus simplified.

With voids adequately filled and once the resin mix begins to gel, the armour clamp assembly and resin pot component may be located within the internal cavity defined as the inner and outer tubular bodies are brought together and secured to one another by way of the cooperating screw threaded portions to complete installation of the barrier cable gland.

Aspects of the present disclosure thus provide a barrier cable gland configured for simple and hassle-free installation and inspection. Aspects of the present disclosure extend to a method of installing a barrier cable gland as described in the foregoing. Aspects of the present disclosure further extend to use of a bright and/or light coloured resin mix in a barrier gland installation as described in the foregoing.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

For example, aspects of the present disclosure can also be applied to cable glands that have no armour or shielding clamp associated with it. Such glands may simply have an inner tubular body that cooperates directly with a union style of nut in order to compress a compression seal onto the outer surface of the sole electrically insulating sheath. A resin pot component having a clear portion and a rigid portion as described in the forgoing may be arranged to fit within and cooperate with an internal cavity defined by the inner tubular body and union style of nut to seal onto the sole electrically insulating sheath at a point proximate exposure of individually electrically insulated conductors extending therefrom. The resin pot component fits within an internal cavity of the cable gland for receiving resin mix therein. The result is a plug of set resin extending from the formerly open end of the resin pot component to the severed end of the electrically insulating sheath in the manner described above such that the plug effectively forms an extension to the electrically insulating sheath.

The resin pot component may take on various shapes and configurations, which may be dictated by the type of cable gland with which the resin pot component is configured to be used. Generally, the resin pot component will have a shape and dimensions which conform with the shape and dimensions of an internal cavity of the cable gland with which the resin pot component is configured to be used. As mentioned, the clear and rigid portions of the resin pot component may be integrally formed. In some embodiments, the clear portion may be rigid. In some embodiments, the rigid portion may be clear.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A barrier cable gland having an outer tubular body, an inner tubular body and a resin pot assembly, the tubular bodies being securable to each other to form an internal cavity, the outer tubular body having a free end forming an entry end for a cable, the resin pot assembly being shaped and dimensioned to locate within the internal cavity and having a closable end, the resin pot assembly having two, coaxial components configured in the installed condition to surround a plurality of individually electrically insulated conductors extending out of the cable sheath, the two, coaxial components of the resin pot assembly including a first hollow component in the form of a clear cylinder providing the closable end of the resin pot assembly which is configured to seal onto a cable sheath of a cable in an installed condition by way of an integrally formed membrane having a centrally locating aperture defined therein, the two, coaxial components of the resin pot assembly including a second hollow component providing an open end of the resin pot assembly which is axially spaced apart from the closable end of the resin pot assembly, wherein the resin pot assembly operatively receives a resin mix therein via the open end thereof, wherein a side wall provided by the first hollow component is clear and wherein the second hollow component is formed from a rigid material.

2. The gland as claimed in claim 1, wherein a first end of the clear cylinder provides the closable end of the resin pot assembly and is partially closed by way of the integrally formed membrane having the centrally locating aperture defined therein for sealing onto the cable sheath in the installed condition.

3. The gland as claimed in claim 1, wherein the clear cylinder is formed from a clear silicone rubber material.

4. The gland as claimed in claim 1, wherein the clear cylinder includes a circumferentially extending groove defined in an outer surface of a side wall thereof, wherein the groove is located approximately midway between ends of the clear cylinder.

5. The gland as claimed in claim 1, wherein the clear cylinder provides an inner compression seal.

6. The gland as claimed in claim 1, wherein a second end of the clear cylinder is open and wherein the clear cylinder includes a securing formation provided towards the second end thereof for cooperating with a corresponding securing formation of the second hollow component.

7. The gland as claimed in claim 6, wherein the securing formation of the clear cylinder is provided by a rib extending circumferentially on an interior surface of a side wall of the clear cylinder.

8. The gland as claimed in claim 1, wherein the second hollow component is in the form of a rigid cylinder including a securing formation provided towards a first end thereof for cooperating with a corresponding securing formation of the first hollow component, and wherein a second end of the rigid cylinder provides the open end of the resin pot assembly.

9. The gland as claimed in claim 8, wherein the securing formation of the rigid cylinder is provided by a groove formation defined on an outer surface of a side wall thereof.

10. The gland as claimed in claim 9, wherein the groove is defined by two spaced apart ribs extending circumferentially on the outer surface of the side wall of the rigid cylinder.

11. The gland as claimed in claim 8, wherein the rigid cylinder is formed from a metallic material.

12. The gland as claimed in claim 1, wherein a second end of the clear cylinder is open, wherein the second hollow component is in the form of a rigid cylinder having an outer circumference of substantially the same dimension as an inner circumference of the clear cylinder and dimensioned such that a friction or interference fit holds the rigid cylinder within and captive relative to the clear cylinder, wherein a second end of the rigid cylinder provides the open end of the resin pot assembly, and wherein the rigid cylinder is formed from a clear, rigid material.

13. The gland as claimed in claim 1, including an armour clamping cone and wherein a first end of the clear cylinder includes a coupling formation for coupling the clear cylinder to the armour clamping cone.

14. A kit including the barrier cable gland as claimed in claim 1 and a two component resin package including a first cylinder having a first liquid therein and a second cylinder having a second liquid therein, and wherein the first liquid is of a bright or light colour and the second liquid is of a colour selected such that the two liquids mix to form a two component resin mix having a bright or light colour.

15. The kit as claimed in claim 14, wherein the first liquid is yellow in colour and the second liquid is of a colour selected such that the two liquids mix to form a two component resin mix having a bright yellow colour.

16. A resin pot assembly for use with a barrier cable gland having an outer tubular body and an inner tubular body being securable to the outer tubular body to form an internal cavity, the resin pot assembly having two, coaxial components being shaped and dimensioned to locate within the internal cavity and having a closable end configured to surround a plurality of individually electrically insulated conductors extending out of the cable sheath, the two, coaxial components of the resin pot assembly including a first hollow component in the form of a clear cylinder providing the closable end of the resin pot assembly which is configured to seal onto a cable sheath of a cable in an installed condition by way of an integrally formed membrane having a centrally locating aperture defined therein, the two, coaxial components of the resin pot assembly including a second hollow component providing an open end of the resin pot assembly and being axially spaced apart from the closable end of the resin pot assembly, wherein the resin pot assembly operatively receives a resin mix therein via the open end thereof, wherein a side wall provided by the first hollow component is clear and wherein the second hollow component is formed from a rigid material.

* * * * *